E. H. Hill.
Making Tubing.
№ 54,346.      Patented May 1, 1866.

Witnesses:
Thos. H. Dodge
H. L. Fuller

Inventor:
Edwin H. Hill

UNITED STATES PATENT OFFICE.

EDWIN H. HILL, OF WORCESTER, MASS., ASSIGNOR TO HIMSELF, L. W. POND, HENRY C. WILSON, W. H. BUTTERFIELD, AND WILLIAM BUNCE.

IMPROVEMENT IN STEAM, WATER, OR OTHER PIPES.

Specification forming part of Letters Patent No. 54,346, dated May 1, 1866.

*To all whom it may concern:*

Be it known that I, EDWIN H. HILL, of the city and county of Worcester, and Commonwealth of Massachusetts, have invented a certain new and useful Improvement in the Mode of Making Pipes for Water, Steam, and other Purposes; and I do hereby declare that the following is a full, clear, and exact description of the same, reference being had to the accompanying drawings, forming a part of this specification, in which—

Figure 1:
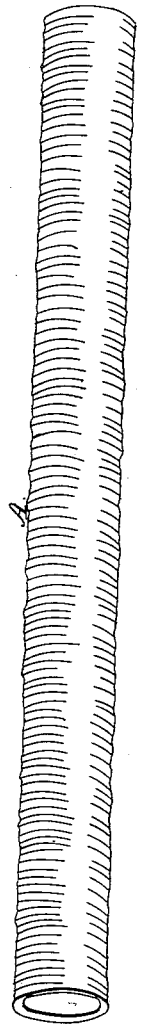
Figure 3:
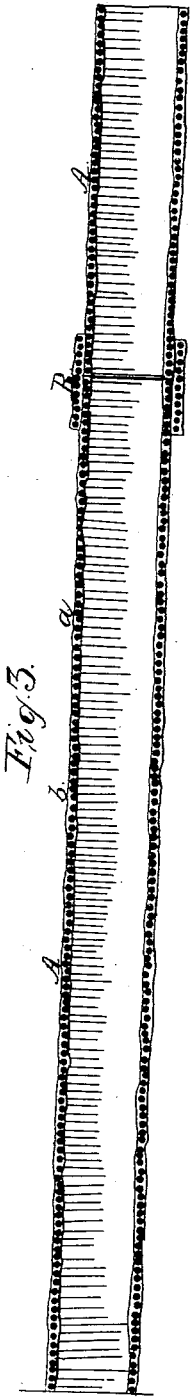
Figure 2:
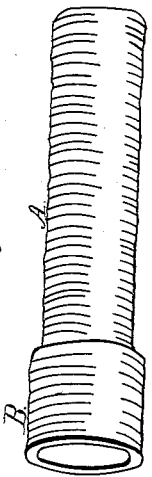

Figure 1 represents a perspective view of a section or piece of pipe made according to my invention. Fig. 2 represents a perspective view of a section of pipe made according to my invention, having a coupling attached to one end thereof; and Fig. 3 represents a longitudinal central section of two pieces of pipe connected by a coupling-piece.

In the drawings, A represents the pipe, and B the coupling-piece. The pipe is made as follows: I take wire and coil it upon a mandrel of the desired size for the bore of the pipe, after which the coiled-wire pipe is dipped or immersed in melted tin or other suitable non-corrosive metal, whereby the coils $a$ of the wire are not only completely coated over with the melted metal, but are at the same time securely united together, as indicated in the drawings, in which $a$ represents the wire, and $b$ the tin-coating.

B represents the coupling, which is made in the same way as the pipe, and then soldered to the ends of the pipes, making a simple and tight joint.

Round, flat, or other shaped wire may be used in the construction of the pipe. The pipe thus made is both strong and non-corrosive, thus obviating many of the objections to the use of lead and iron pipes.

Having described my invention, what I claim as new, and desire to secure by Letters Patent, as an improved article of manufacture, is—

A pipe for water, steam, and other purposes, made as described, and shown in the accompanying drawings.

EDWIN H. HILL.

Witnesses:
 THOS. H. DODGE,
 D. L. MILLER.